(12) United States Patent
Sugita et al.

(10) Patent No.: US 7,974,210 B2
(45) Date of Patent: Jul. 5, 2011

(54) MULTI-SIGNAL ANALYSIS DEVICE

(75) Inventors: Mitsuharu Sugita, Kitamoto (JP);
Yasunori Urano, Hino (JP)

(73) Assignee: A & D Company, Ltd., Tokyo (JP)

( * ) Notice: Subject to any disclaimer, the term of this patent is extended or adjusted under 35 U.S.C. 154(b) by 1425 days.

(21) Appl. No.: 10/571,516

(22) PCT Filed: Sep. 14, 2004

(86) PCT No.: PCT/JP2004/013375
§ 371 (c)(1),
(2), (4) Date: May 2, 2006

(87) PCT Pub. No.: WO2005/028838
PCT Pub. Date: Mar. 31, 2005

(65) Prior Publication Data
US 2007/0057829 A1    Mar. 15, 2007

(30) Foreign Application Priority Data
Sep. 24, 2003    (JP) ................ 2003-331398

(51) Int. Cl.
*G01R 31/08*    (2006.01)

(52) U.S. Cl. .................................. 370/252

(58) Field of Classification Search ........... 341/126; 370/252
See application file for complete search history.

(56) References Cited

U.S. PATENT DOCUMENTS

| 3,134,896 | A | * | 5/1964 | Briggs ........................ 702/72 |
| 4,753,206 | A | * | 6/1988 | Inoue et al. ................ 123/480 |
| 5,012,422 | A | * | 4/1991 | Takahashi et al. ......... 701/106 |
| 5,063,901 | A | * | 11/1991 | Kaneyasu et al. ....... 123/406.13 |
| 7,191,591 | B2 | * | 3/2007 | Zhang et al. .............. 60/295 |

FOREIGN PATENT DOCUMENTS

| JP | 08-503076 | 4/1996 |
| JP | 09-170967 | 6/1997 |
| JP | 2982774 | 9/1999 |
| JP | 3128832 | 11/2000 |

OTHER PUBLICATIONS

Rhode, Bill, Review of Basic Signal Analysis, Feb. 1976, Revised Jan. 12, 2003, all.*

* cited by examiner

*Primary Examiner* — Derrick W Ferris
*Assistant Examiner* — Angel Brockman
(74) *Attorney, Agent, or Firm* — Jordan and Hamburg LLP

(57) ABSTRACT

A multi-signal analyzer (1) includes an AD converter (11) for simultaneously receiving a plurality of time series signals representing physical and chemical phenomena and subjecting the signals to AD conversion, a delay time calculation unit (19) for calculating the delay time between arbitrary two signals x(1) and y(1) input to the AD converter (11), a time axis adjustment unit (39) for advancing or delaying the time axis of one of the arbitrary two signals according to the delay time calculated by the delay time calculation unit (19) to thereby make the two signals to have the same time axis, and a data analyzer (41) for performing analysis such as determining a mutual correlation coefficient for the two signals made to have the same time axis.

6 Claims, 15 Drawing Sheets

MULTI-SIGNAL ANALYSIS DEVICE

TECHNICAL FIELD

The present invention relates to a multi-signal analysis device (hereinafter, "multi-signal analyzer"), and more particularly, to a device for analyzing a correlation between a reference signal and a signal with a large delay time in comparison with the reference signal in a transient state.

BACKGROUND ART

Although the technical advance of an engine is indispensable as a background for supporting the development of an automobile industry, recently, regulations on exhaust emissions, which is made tighter than ever due to the effect of environmental problems, cause the automobile manufacturers of the respective countries to shift to design an engine for coping with a more strict regulation for environmental pollution.

At present, an engine control technology in the main stream is an ECU (Engine Control Unit or Electric Control Unit). The ECU is of a microcomputer which precisely controles an amount of injected fuel, a timing of fuel injection, a timing of ignition, and the like, based on the information detected by sensors disposed around an engine so that the engine can be kept in an optimum condition.

An exhaust gas regulation requires the ECU to optimize the engine not only from a view point of a generated torque but also from a view point of exhaust gas. Moreover, in some countries it has been determined to measure exhaust gas by minutely determining complex time series patterns and vehicle speeds during the analysis of exhaust gas, and the exhaust gas analysis includes a wide variety of items as to many parameters.

Accordingly, the ECU must determine a correlation among signals obtained from many sensors and reflect the correlation to an engine control.

Heretofore, it has been attempted to determine a correlation by measuring the many signals and displaying them on the same screen (refer to, for example, patent document 1).

In this case, however, technical problems described below arise.

Patent document 1: Japanese Patent Laid-open Publication No. 9-170967

DISCLOSURE OF THE INVENTION

Problems to be Solved by the Invention

Since the invention disclosed in the patent document 1 simply displays automobile test data composed of many parameters on the same screen so that they can be viewed easily, the data must be analyzed additionally to determine the correlation among the data.

Moreover, since the characteristics of an engine-generated torque, exhaust gas, and the like arise from a complex combination of many factors such as a fuel injection characteristic, an air intake characteristic, an ignition timing, fuel injection, and the like, such characteristics cannot be easily analyzed.

Accordingly, these factors are conventionally analyzed in a steady state. However, since the signal related to exhaust gas has a delay time larger than those of other signals because of delays due to a chemical reaction, a physical and spacial distance, a gas flow rate, and the like, a long time is required before these factors are analyzed in a steady state.

Further, although an exhaust gas regulation requires to perform an analysis of an engine in a transient state in addition to the conventional analysis in a steady state, since the signal related to exhaust gas has a large delay time as compared with the other signals, it is difficult to analyze the signal in a transient state.

An object of the present invention, which was made in view of the conventional problems as described above, is to provide a device that can analyze correlations among a plurality of signals not only in a steady state but also in a transient state.

Means for Solving the Problems

To achieve the above problem, a multi-signal analyzer of the present invention includes an AD converter for simultaneously receiving a plurality of time series signals representing physical and chemical phenomena and subjecting the signals to AD conversion, a delay time calculation unit for calculating the delay time between arbitrary two signals input to the AD converter, a time axis adjustment unit for advancing or delaying the time axis of one of the arbitrary two signals according to the delay time calculated by the delay time calculation unit to thereby make the two signals to have the same time axis, and a data analyzer for performing analysis such as determining a mutual correlation coefficient by comparing the two signals made to have the same time axis.

In the multi-signal analyzer arranged as described above, since a plurality of signals having a different delay time are analyzed after they are made to have the same time axis, the advancement and delay of time relations among a plurality of time series signals are eliminated, thereby allowing comparison and analysis to be performed in a transient state.

Further, the time axis adjustment unit can make the other signals to have the same time axis using the time axis of one signal selected from among the signals input to the AD converter as a reference.

By providing the signal acting as the reference, the correlations among many signals can be displayed so that they become obvious at a glance.

Further, the time series signals are signals including a steady state, and at least one of the time series signals may have a delay time of 10 or more seconds as compared with the other signals.

More specifically, the time series signals include at least the fuel flow rate, the number of generated torques, the speed, and the amount of exhaust gas of an automobile engine, and the result of analysis by the data analyzer can be used for controlling ECU of the engine.

Since the amount of exhaust gas of the automobile, the amount of chemical reaction of a fuel cell, and the like have a particularly large delay time, it is difficult to analyze the correlation between each of them and other signals in a transient state. Accordingly, to analyze the correlations among the above signals and the other signals after making the signals to have the same axis is useful in experiments for improving the efficiency of exhaust gas and the performance of the fuel cell.

Effect of the Invention

According to the multi-signal analyzer of the present invention, since a plurality of signals having different delay times are analyzed after they are made to have the same time axis, the advancement and delay of time relations among a plurality of time series signals are eliminated, thereby allowing comparison and analysis to be performed in a transient state. Further, a reasonable result of analysis can be derived without an oversight of correlations buried among many pieces of data already obtained through a troublesome processing.

In particular, it is difficult to analyze correlations between the amount of exhaust gas of an automobile, the amount of a chemical reaction of a fuel cell, or the like and the other signals in a transient state because they have large delay times. Accordingly, to analyze the correlations between the above signals and the other signals after making the signals to have the same axis is useful in the experiments for improving the efficiency of exhaust gas and the performance of the fuel cell.

BEST MODE FOR CARRYING OUT THE INVENTION

A preferable embodiment of the present invention will be described below in detail based on accompanying drawings. FIGS. 1 to 3 show an example of a multi-signal analyzer according to the present invention.

The multi-signal analyzer 1 of FIG. 1 includes an AD converter 11, a memory 13, a time window extraction unit 15, an operation/input unit 17, a delay time calculation unit 19, a time axis adjustment unit 39, a data analyzer 41, and a display unit 43.

The AD converter 11 is a means for simultaneously receiving a plurality of signals used as subjects for analyzing a mutual correlation and the like and subjecting the input signals to AD conversion. The input signals are time series signals related to arbitrary physical phenomena or chemical phenomena, such as for example the amount of injected fuel, the amount of generated torque, the number of engine relations, the amount of exhaust gas, and the like, which are necessary to control an ECU of an engine, correspond to the input signals. These signals are detected by sensors disposed in respective sections of an automobile and input to the AD converter 11. The input signals may include those in a transient state in addition to a steady state. The AD-converted signals are temporarily stored in the memory 13 to analyze the mutual correlation later.

Note that the transient state indicates a state until an unstable signal settles to a steady state and generally occurs at the start and end of energization, measurement, operation, and the like, although it also occurs when an effect of external disturbance exists or a setting is changed. The steady state indicates a state in which a signal has settled to a steady value after it passes through the transient state. Accordingly, in general, an input signal includes both the transient state and the steady state.

The time window extraction unit 15 is a means for selecting arbitrary two signals from the signals input to the AD converter 11 in response to an operation from the operation/input unit 17 and extracting a time window for the two selected signals at an arbitrary analyzing time interval.

Extraction of the time window means to cut off signals in certain intervals (for example, 1024 point, 2048 point) from the signals sampled by the AD converter 11 so that they can be processed in subsequent processings. The subsequent processings mainly mean a Fourier Transformation processing (transformation of a time function x(t) to a frequency function X(f)) and an Inverse Fourier Transformation processing.

Essentially, the Fourier Transformation processing is logically defined as a processing of a signal having an infinite length. However, since a signal actually input to the AD converter 11 is a signal having a finite length, the processing is performed under the assumption that a time window is extracted by the time window extraction unit 15 and a waveform in an extracted interval is repeated infinitely.

The Fourier Transformation processing is performed essentially on a signal with an unknown cycle. In general, although it is assumed that a waveform is cut off in a definite interval in a measuring system, a cycle of a signal does not always match with the interval of the signal to be cut off. Accordingly, when the cut-off interval does not match with an integral multiple of the frequency of the signal, since discontinuous points, at which the beginning ends of repeated waveforms are not connected to the terminal ends thereof, are made, a distorted signal different from an original cut-off signal is processed.

To cope with the above problem, the time window extraction unit 15 reduces an error of the Fourier Transformation processing caused by different cut-off positions by multiplying dancette weighing functions by which both ends of a waveform at which it is cut off are set to zero so that waveforms are connected to each other at the beginning ends and the terminals end thereof. The weighing function used here is called a window function, and a typical window function is the Hanning Window. In the example of the present invention, however, a function suitable for the processing may be input from the operation/input unit 17 and designated according to a signal input to the AD converter 11.

The delay time calculation unit 19 is a means for calculating the delay time between arbitrary two signals from which time windows are extracted by the time window extraction unit 15. One example of the detailed configurational view of the delay time calculation unit 19 is shown in FIGS. 2 and 3.

A delay time calculation unit 19a shown in FIG. 2 determines a delay time by determining a mutual correlation function between two signals and includes a delay time generation unit 21, a mutual correlation calculation unit 23, and a delay time controller 29.

The correlation function is a function of an amount of shift $\tau$ when the waveform of one of two signals (for example, x(t) of input signals x(t) and y(t) shown in FIG. 2) is delayed by a time $\tau$ by the delay time generation unit 21 and shown by the following equation by the multiplication and integration of a multiplication unit 25 and an integration unit 27 in the mutual correlation calculation unit 23.

$$R_{xy}(t) = \lim_{T \to 0} \frac{1}{T} \int_{-\Sigma/2}^{\Sigma/2} x(t)y(t+\tau)dt \qquad \text{[Equation 1]}$$

The mutual correlation function is an index showing a degree of similarity between two signals, and when the two signals are completely different from each other, the mutual correlation function approaches zero regardless of the value $\tau$. The delay time controller 29 finds the value $\tau$, by making use of the above property when the mutual correlation function becomes maximum while controlling the amount of the delay time $\tau$ applied to one of the signals by the delay time generation unit 21. The value $\tau$ corresponds to the delay time generated between the two signals.

Note that the mutual correlation function can be also determined by subjecting a cross spectrum $W_{XY}(f)$ shown by the following equation to an Inverse Fourier Transformation processing when the two signals (the input signals x(t) and y(t) shown in FIG. 2) are set to X(f) and Y(r) after being subjected a Fourier Transformation processing and the conjugate complex number of the one signal X(f) is shown by X*(f).

$$W_{XY}(f) = \overline{X^*(f)Y(f)} \qquad \text{[Equation 2]}$$

In contrast, a delay time calculation unit 19b shown in FIG. 3 has a delay time calculation means different from that of the delay time calculation unit 19a shown in FIG. 2 in that it determines the delay time by determining an impulse response output and includes an FFT calculation unit 31 and an impulse response calculation unit 33.

The impulse response output is obtained by transforming the two signals (input signals x(t) and y(t) shown in FIG. 3) to X(f), Y(f), respectively, by subjecting them to the Fourier Transformation processing by FFT calculation units 31a, 31b, multiplying the conjugate complex number of one signal (Y(f) in FIG. 3) and the other signal (X(f) in FIG. 3) by a cross spectrum calculation unit 35 in the impulse response calculation unit 33 to thereby multiply the same frequency components, and averaging them by an average calculation unit 37 to thereby determine the cross spectrum $W_{XY}(f)$ also shown in the above equation 2.

The x-axis of the impulse response output is represented by frequency, and the y-axis thereof is represented by the square of amplitude (power spectrum of each frequency band). A large cross spectrum value in a certain frequency means that a large correlation exists between two signals at such frequency. Accordingly, a time at which the value of the impulse response output reaches its peak is determined as the delay time between the two signals.

The time axis adjustment unit 39 is a means for advancing or delaying one of the two signals stored in the memory 13 by a delay time based on the delay time between the two signals obtained by the delay time calculation unit 19 to thereby make the two signals to have the same time axis. Note that the configuration of the delay time calculation unit 19 may be realized by an arrangement other than the arrangements shown in FIGS. 2 and 3, and the delay time need not be always determined by the arrangements shown in FIGS. 2 and 3. That is, it is also possible to determine the impulse response output by, for example, the Inverse Fourier Transformation processing of a frequency response function. Further, the time axis can be adjusted by the time axis adjustment unit 39 regardless the magnitude of the delay time.

The data analyzer 41 is a means for performing analysis such as determining a correlation coefficient of the two signals made to have the same time axis. Signals to be analyzed may be signals including a transient state, and since the plurality of signal are made to have the same time axis even in such a case, an appropriate result of analysis can be obtained. The result of analysis is stored in the memory 13.

The display unit 43 is a means for displaying the result of analysis performed by the data analyzer 41 by a numerical value, a graph, and the like. Note that the display unit 43 may display the signals which are made to have the same time axis and which are before the analysis is performed by the data analyzer 41 and the delay time determined by the delay time calculation unit 19.

EXAMPLE

An example of the present invention will be described below in detail. FIG. 4 shows a layout view of sensors disposed in respective sections of an automobile, in which the multi-signal analyzer 1 of the present invention is used to analyze an automobile engine to thereby cause an ECU to perform an effective control. Since the detailed arrangement of the multi-signal analyzer 1 is as described above, the explanation thereof is omitted.

The sensors are disposed in the respective sections in the vicinity of the engine 51. More specifically, they include a fuel flow meter 55 disposed on a fuel tank 53, a torque sensor 59 disposed in the vicinity of a crank shaft 57 to detect the number of torque events, a tachometer 61 for detecting an engine speed, and an exhaust $NO_x$ sensor 65 for detecting an amount of $NO_x$ in the components of exhaust gas exhausted from a muffler 63.

Note that, in the example, although only the amount of $NO_x$ is detected in the components of the exhaust gas, sensors for detecting CO, $CO_2$, T-HC, $CH_4$, $N_{20}$, $SO_2$, $O_2$ may be provided.

FIG. 5 is a graph simultaneously showing the time series signals detected by the four sensors shown in FIG. 4 for about two minutes from the start of the engine 51. Note that graph of FIG. 5 can be obtained by simply displaying the signals simultaneously input to the multi-signal analyzer 1 by the display unit 43 thereof or may be displayed by an display unit other than the display unit 43.

Since the respective signals displayed as described above show a transient state in an initial stage (at the start of the engine 51), they have random and dispersed waveforms at first glance, and thus correlations among the respective signals are not apparent. In particular, a delay occurs at random due to a physical behavior during a period from the combustion of fuel to the generation of torque and during a period from the generation of torque to the rotation of engine, and further delays occur due to physical phenomena and chemical phenomena entangled with each other in a complex manner during a period until exhaust gas is generated. These further delays include a delay due to a chemical reaction, a delay due to a physical and spacial distance, a delay due to a gas flow rate, a delay of conversion of the electric signals of the sensors of a measurement system, a delay inherent to the measurement units, and the like. These delay times make it more difficult to compare and analyze the multi-signals in the transient state.

To overcome the above difficulty, heretofore, the analysis between the respective signals detected by all the sensors is performed after the signals have settled to a steady state.

However, sensors for detecting exhaust gas include a variety of sensors from a sensor with a quick response time to a sensor with a slow response time, and a signal from the sensor with a slow response time may have a delay time of 10 seconds or more as compared with the other sensors and requires a long time until it settle to a steady state, which has been a cause of delay in an analysis processing.

To cope with this problem, when it is intended to obtain a mutual correlation between detected signals in a transient state, graphs shown in FIGS. 6 to 9 are obtained. FIGS. 6 to 9 are the graphs showing the mutual correlations between arbitrary two signals from among a fuel flow amount, a generated torque, an engine speed, and an amount of $NO_x$. The lateral axes and the vertical axes of these graphs show the values of the two signals at the same time.

When the mutual correlation coefficient of the respective two signals are determined from the graphs of FIGS. 6 to 9, the mutual correlation coefficient between the fuel flow rate and the generated torque of FIG. 6 is 0.96, the mutual correlation coefficient between the fuel flow rate and the engine speed of FIG. 7 is 0.36, the mutual correlation coefficient between the fuel flow rate and the amount of $NO_x$ of FIG. 8 is 0.12, and the mutual correlation coefficient between the generated torque and the amount of $NO_x$ of FIG. 9 is 0.16. Note that a mutual correlation function nearer to 1 shows a higher correlation.

Accordingly, when signals in the transient state are analyzed in a state that many time series signals are simply displayed at the same time as shown in FIG. 5, a result that the mutual correlations between the respective two signals are low except for the mutual correlation coefficient between the fuel flow rate and the generated torque.

However, since it is not true that no mutual correlation exists between these signals, an erroneous result of analysis will be derived when the mutual correlations are analyzed by the conventional method.

To overcome the above drawback, the multi-signal analyzer 1 of the present invention derives a more reasonable mutual correlation by extracting arbitrary two signals from the signals input to the AD converter 11, calculating a delay time between the extracted two signals by the delay time calculation unit 19, making the two signals to have the same time axis by adjusting the time axes of them by the time axis adjustment unit 39 based on the calculated delay time, and making it possible to perform a comparison analysis of mutual correlations in the transient state by the data analyzer 41.

When the multi-signal analyzer 1 of the present invention is used, first, the time series signals of the respective sensors shown in FIG. 5 are simultaneously input to the AD converter 11 upon the start of the engine 51 and stored in the memory 13. Arbitrary two signals are selected from such signals by the operation/input unit 17 (the fuel flow rate and the amount of $NO_x$, for example, are selected here), subjected to a time window extraction processing at a sampling time of 10 msec by the time window extraction unit 15 until 40 seconds elapse from the start of detection of the sensors, and a mutual correlation function of the signals is obtained by the delay time calculation unit 19. As a result, a mutual correlation characteristic as shown in FIG. 10 is obtained. Note that the mutual correlation function of FIG. 10 means an impulse response output obtained by the delay time calculation unit 19$b$ shown in FIG. 3.

Since a delay time between the two signals of the fuel flow rate and the amount of $NO_x$ is determined from a time at which the value of the correlation function reaches a peak A in the graph of FIG. 10, it can be found that the delay time is 11 seconds.

Likewise, a delay time between the fuel flow rate and the generated torque, and a delay time between the fuel flow rate and the engine speed are determined by selecting respective pertinent two signals. As a result, it was calculated that the delay time between the fuel flow rate and the generated torque was 0.6 second, and the delay time between the fuel flow rate and the engine speed was 1.2 seconds.

It should be noted that when a delay time between arbitrary two signals from among many signals is determined, one signal (fuel flow rate here) is selected at all times as a subject for calculating the delay time as in the example so that subsequent processings can be performed easily. With this operation, since the other signals are made to have the same time axis using the time axis of the one signal as a reference, delay times among all the signals can be easily determined.

Further, to perform the analyzing processing at a high speed, the type of the time series signals input to the AD converter 11 and the combination of signals for which delay times are calculated by the delay time calculation unit 19 may be previously selected by the operation/input unit 17 or stored in the memory 13 and a processing by the delay time calculation unit 19 may be started as soon as or with a predetermined delay time after the signals input to the AD converter 11 begin to be stored in the memory 13. In this case, since the delay time calculation processing is performed along with the storing operation of the memory 13, the processing can be performed at a high speed. Further, when a plurality of sets of the delay time calculation units 19 are provided, delay times of a plurality of sets of two signals can be determined at the same time, facilitating a further increase of a processing speed.

The time axis adjustment unit 39 extracts the signals temporarily stored in the memory 13 and advances or delays the time series signals shown in FIG. 5 based on the delay times determined by the delay time calculation unit 19 using the time axis of the fuel flow rate as a reference. FIG. 11 shows a result of such operation. Note that a graph as shown in FIG. 11 may be displayed on the display unit 43. The correlations become obvious at a glance by displaying the other signals by making them to have the same time axis using the one signal as the reference as described above, whereby many signals can be compared with each other and analyzed easily.

The data analyzer 41 determines the mutual correlation coefficients functions in the transient state of the respective two signals of the same combination as that determined in FIGS. 6 to 9 as to the time series signals in which delay times are adjusted in FIG. 11. FIGS. 12 to 15 show results of the determination.

The mutual correlation coefficient between the fuel flow rate and the generated torque of FIG. 12 is 0.95, the mutual correlation coefficient between the fuel flow rate and the engine speed of FIG. 13 is 0.51, the mutual correlation coefficient between the fuel flow rate and the amount of $NO_x$ of FIG. 14 is 0.90, and the mutual correlation function between the generated torque and the amount of $NO_x$ of FIG. 15 is 0.85.

It can be seen from what is described above that the mutual correlation coefficients between the respective signals determined in FIGS. 12 to 15 are increased more than those with respect to the mutual correlation functions between the respective signals, determined in FIGS. 6 to 9, which permits the engine 51 to be analyzed reasonably. Although the delay time between the fuel flow rate and the engine speed was, for example, 1.2 seconds as determined above, since the correlation increases even if the time axis is adjusted by only 1.2 seconds, it can be seen from the result of analysis of the data analyzer 41 of the example how a delay time on the second time scale significantly affects the correlation.

The data analyzer 41 stores the result of analysis in the memory 13, and the display unit 43 displays it in a required display format (numerical value, graph, and the like).

As described above, when correlations between many signals including the transient state are analyzed, since the multi-signal analyzer 1 of the present invention analyzes a plurality of signals having different delay times by making them to have the same time axis, the advance and delay of a time relation among a plurality of time series signals are eliminated, whereby comparison and analysis in the transient state can be made possible. Further, the multi-signal analyzer 1 of the present invention is an effective means for deriving a reasonable result of analysis without an oversight of correlations buried among many pieces of data obtained through a troublesome processing.

A delay time of from 1 to 11 seconds exists between the arbitrary two signals as described in the example, this delay time is a very large value as compared with a delay time on the millisecond or microsecond time scale that is ordinarily generated in an ordinary sensor or electronic circuit. When a mutual correlation between signals having such a large delay time (in particular, 11 seconds) is analyzed, if the analysis is performed after the signals have settled to a steady state, the analysis takes a long time, whereas when the analysis is performed in a transient state, an erroneous result of the analysis is derived because phenomena to be analyzed are complex. Accordingly, when at least one of input time series signals has a delay time of 10 seconds or more as compared with the other signals, an effective result of analysis can be obtained by the use of the multi-signal analyzer 1 of the present invention. Note that it is a matter of course that the multi-signal analyzer 1 of the present invention can be also used when a delay time between two signals is small.

In particular, since measurement of exhaust gas shifts from measurement in a steady state to measurement in a transient state in response to an exhaust gas regulation, the multi-signal analyzer 1 of the present invention becomes a means that can be effectively applied to an experiment for improving an exhaust gas efficiency by devising an exhaust gas passage to reduce exhaust gas, and the like. A result of analysis obtained by the multi-signal analyzer 1 of the present invention can be also used to minimize an amount of exhaust gas by controlling the ECU in correspondence to various running modes of an automobile.

Although the correlation between the fuel flow rate and the amount of $NO_x$ of the engine 51 is analyzed in the example, other components of exhaust gas such as CO, $CO_2$, T-HC, $CH_4$, $N_2O$, $SO_2$, $O_2$ can be analyzed likewise. In particular, since $NO_x$, CO, HC that are called the worst three components of exhaust gas are different with respect to a cause of generation, a method of reducing a generated amount, a delay time, and the like depending on a property of the gas, it is difficult to reduce all of them in a good balance. Thus, the exhaust gas regulation can be coped with by the use of the multi-signal analyzer 1 of the present invention because a correlation between arbitrary two signals can be easily analyzed thereby.

Further, signals in a transient state can be also analyzed using the multi-signal analyzer 1 of the present invention in a performance improving experiment of a fuel cell with a relatively large delay such as a delay due to an electro-chemical reaction, a delay of flow rate due to a gas passage, and the like, in addition to the purpose of improving an automobile engine and minimizing exhaust gas.

DESCRIPTION OF REFERENCE NUMERALS

Figure 1:
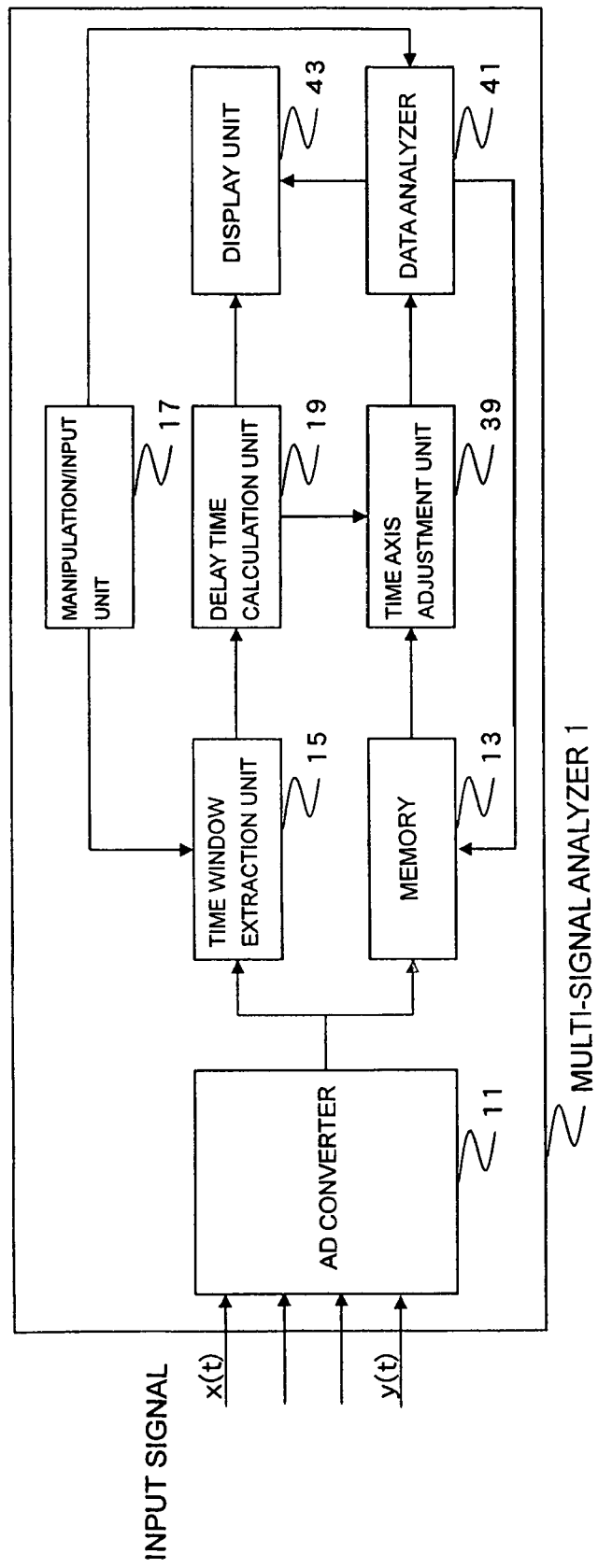
FIG. 1 is a configurational view of a multi-signal analyzer according to the present invention.
Figure 2:
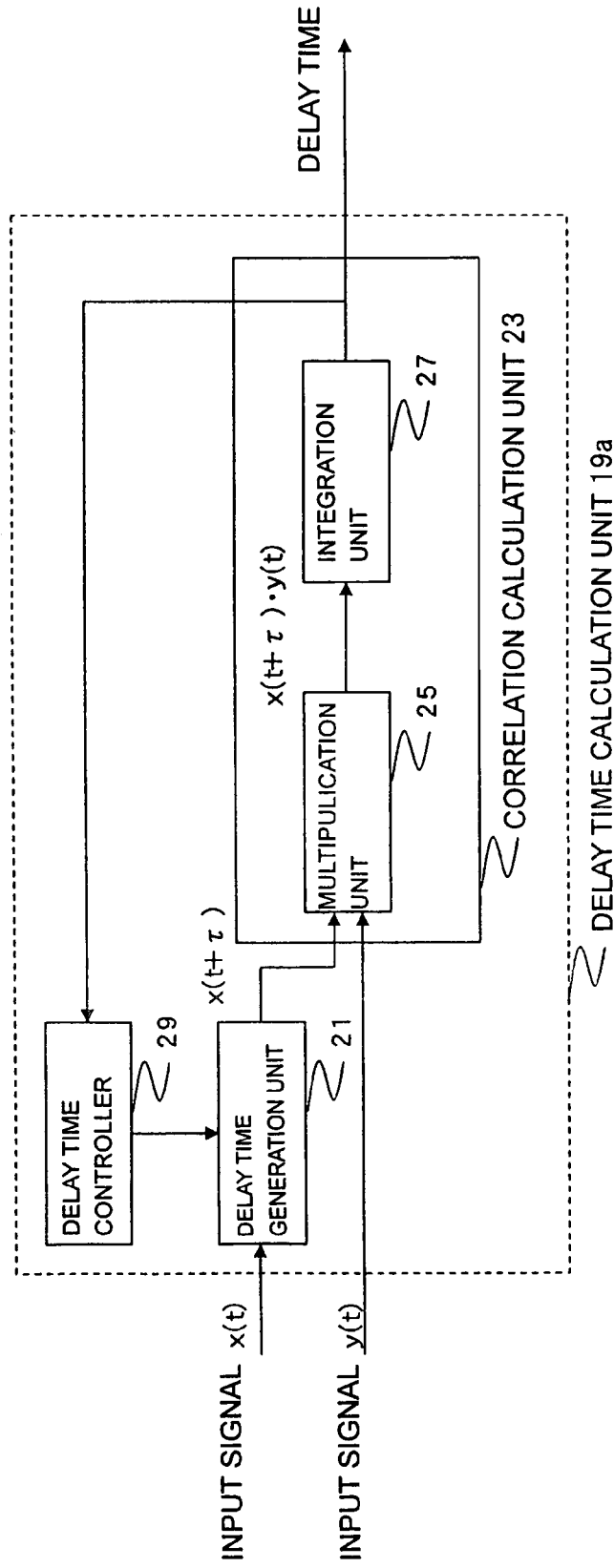
FIG. 2 shows an example of a detailed configurational view of a delay time calculation unit shown in FIG. 1.
Figure 3:
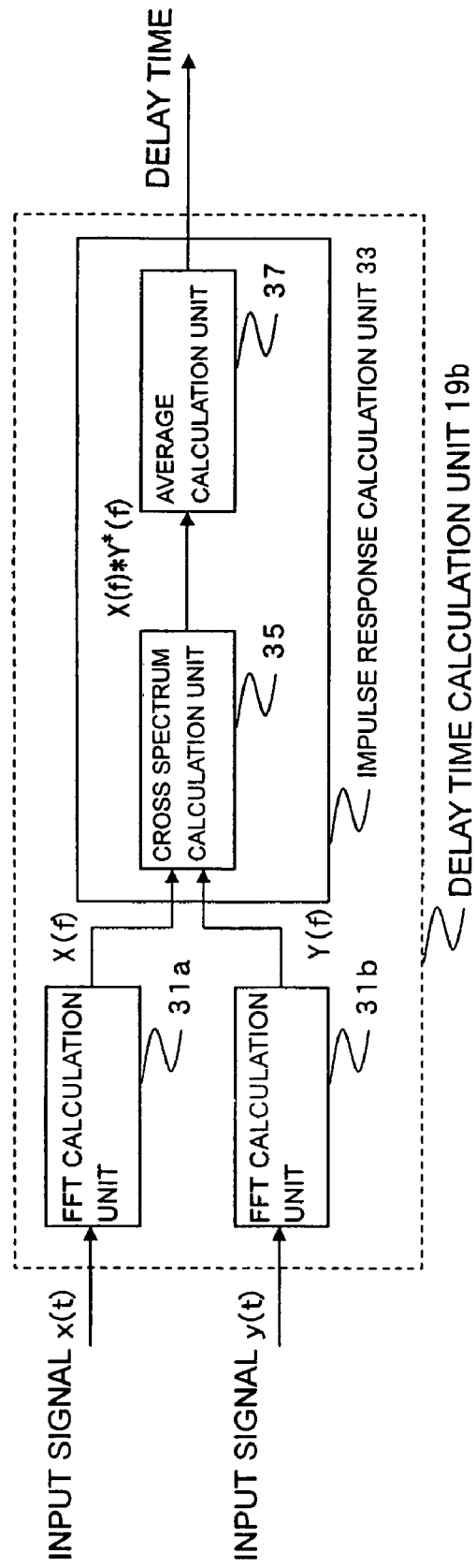
FIG. 3 shows an example of another detailed configurational view of the delay time calculation unit shown in FIG. 1.
Figure 4:
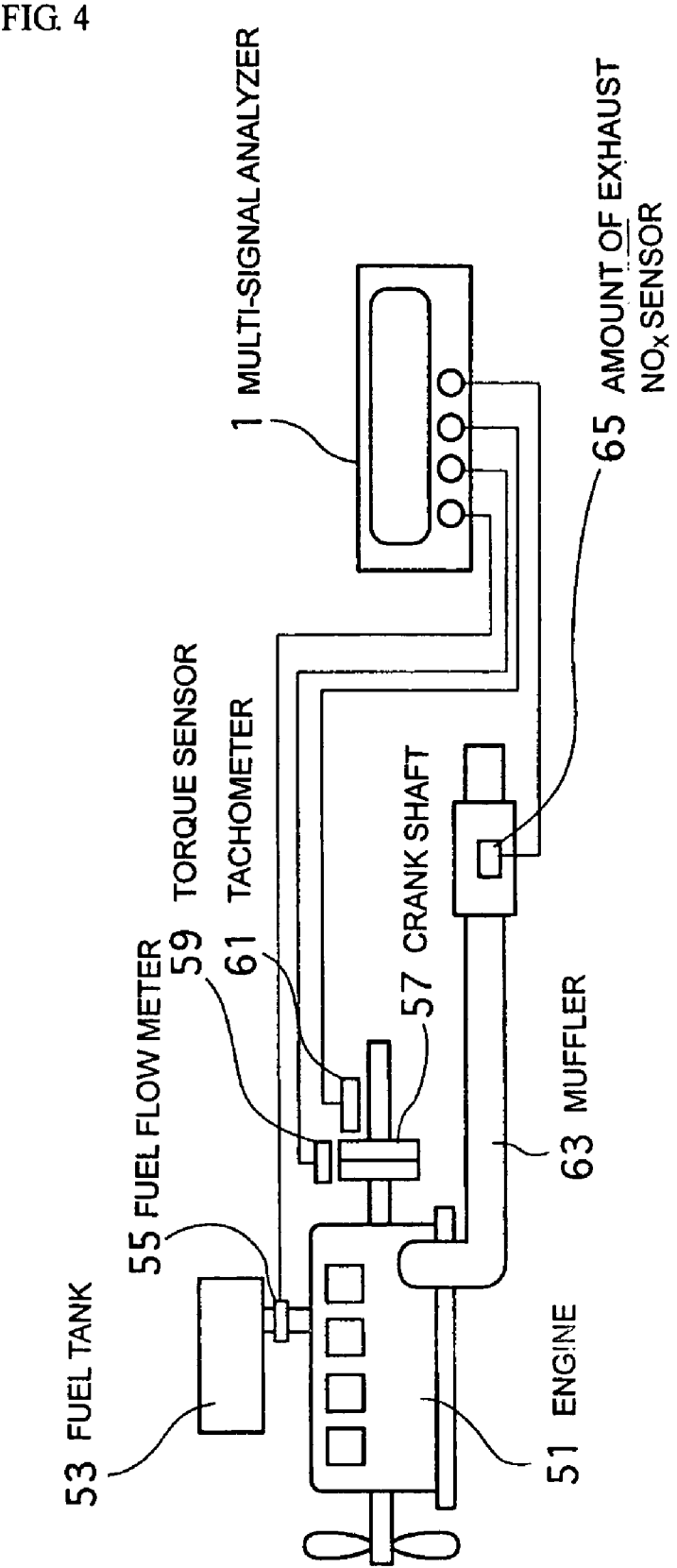
FIG. 4 is a layout view of sensors disposed in respective sections of an automobile engine.
Figure 5:
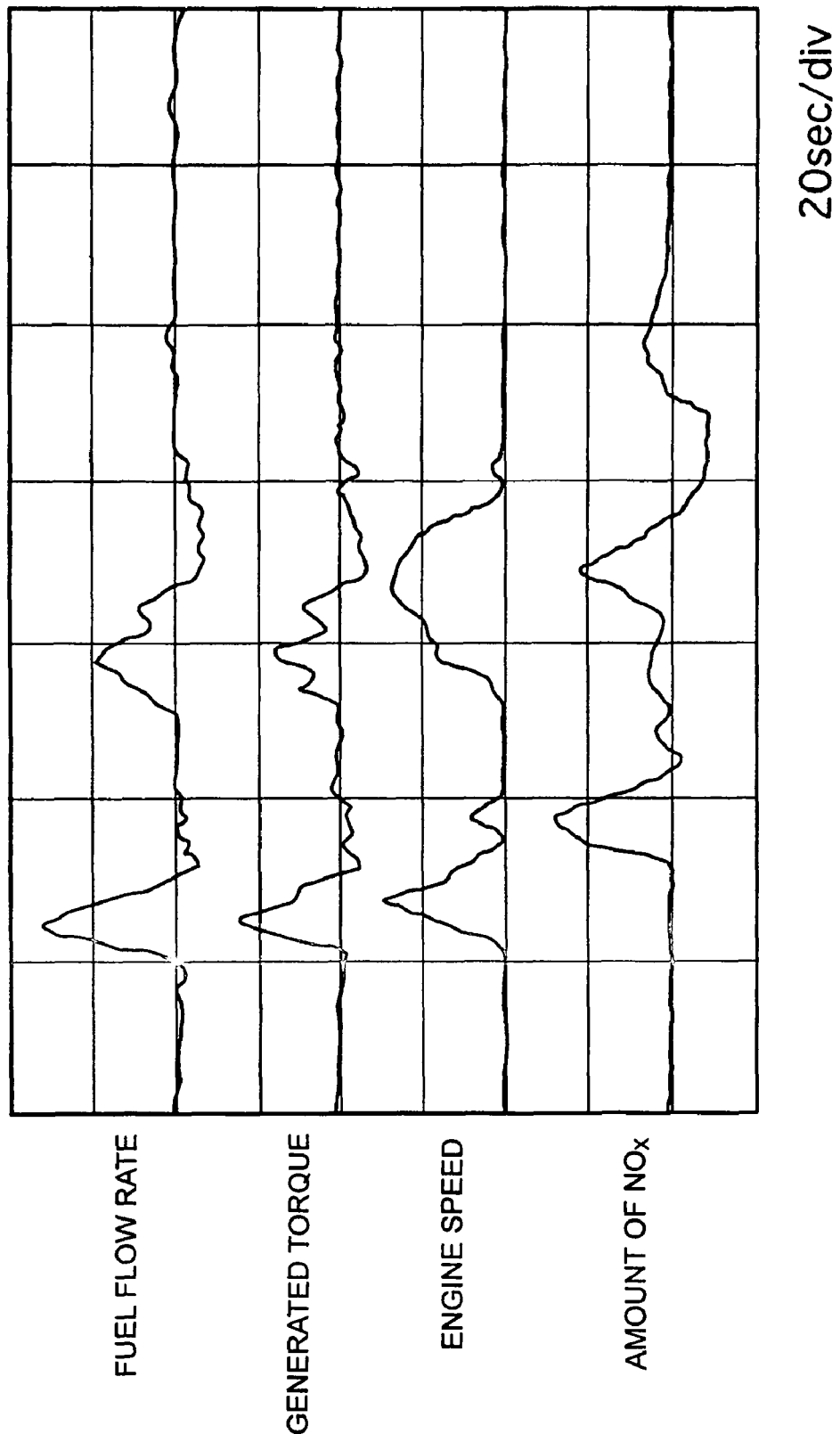
FIG. 5 is a graph simultaneously showing the time series signals detected by the sensors shown in FIG. 4.
Figure 6:
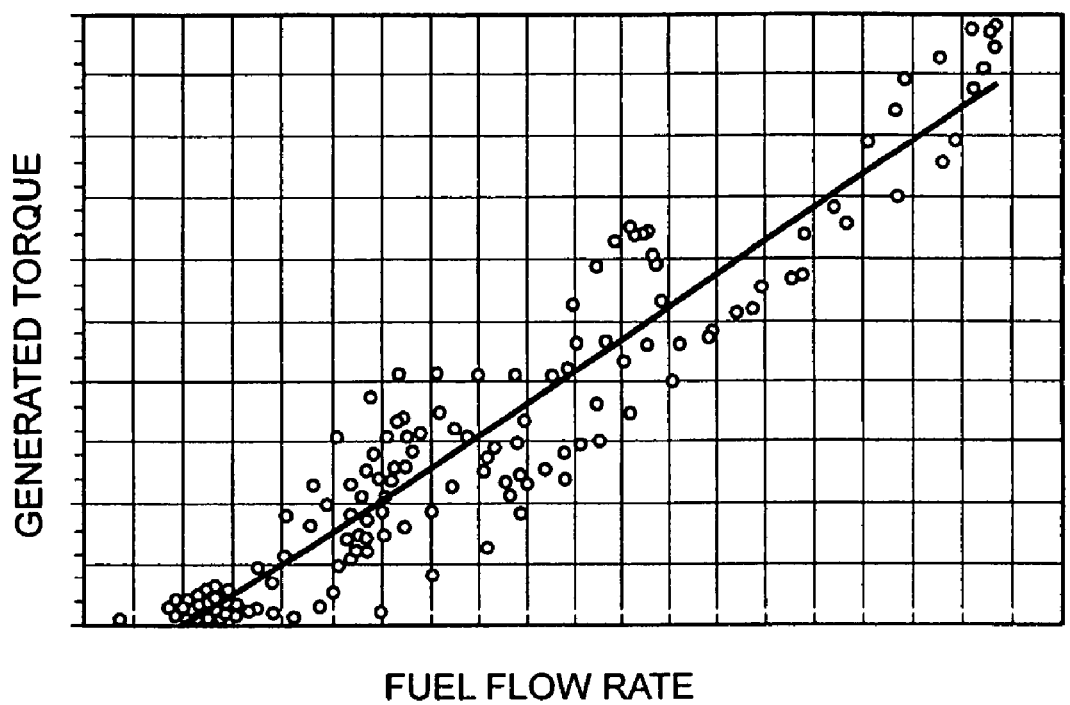
FIG. 6 is a graph showing a correlation between a fuel flow rate and a generated torque in the graph of FIG. 5.
Figure 7:
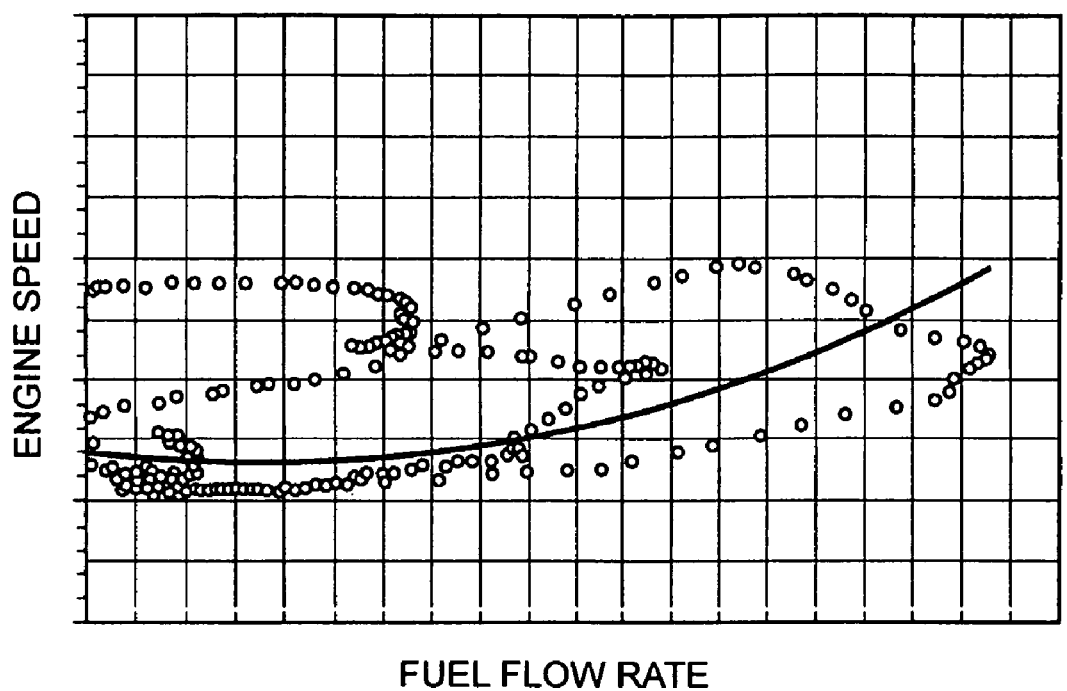
FIG. 7 is a graph showing a correlation between the fuel flow rate and an engine speed in the graph of FIG. 5.
Figure 8:
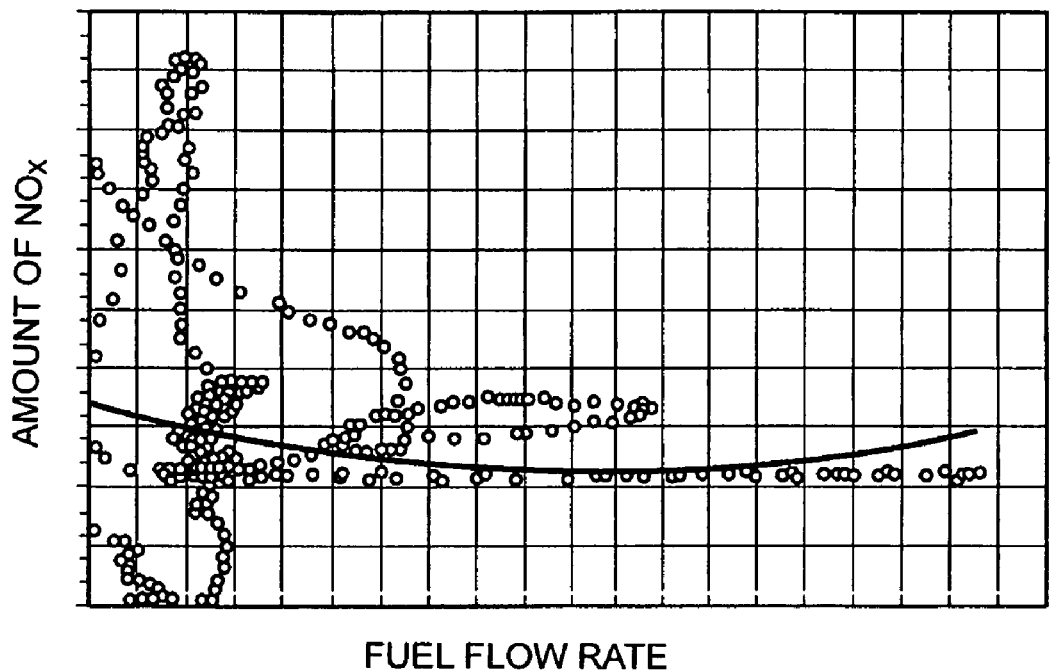
FIG. 8 is a graph showing a correlation between the fuel flow rate and an amount of $NO_x$ in the graph of FIG. 5.
Figure 9:
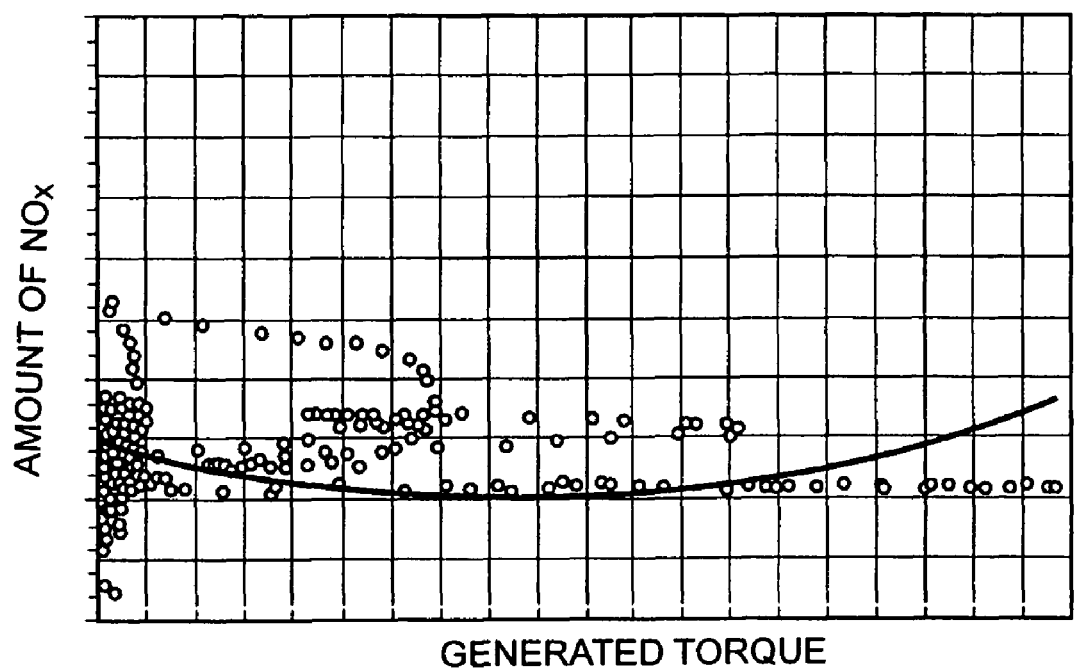
FIG. 9 is a graph showing a correlation between the generated torque and the amount of $NO_x$ in the graph of FIG. 5.
Figure 10:
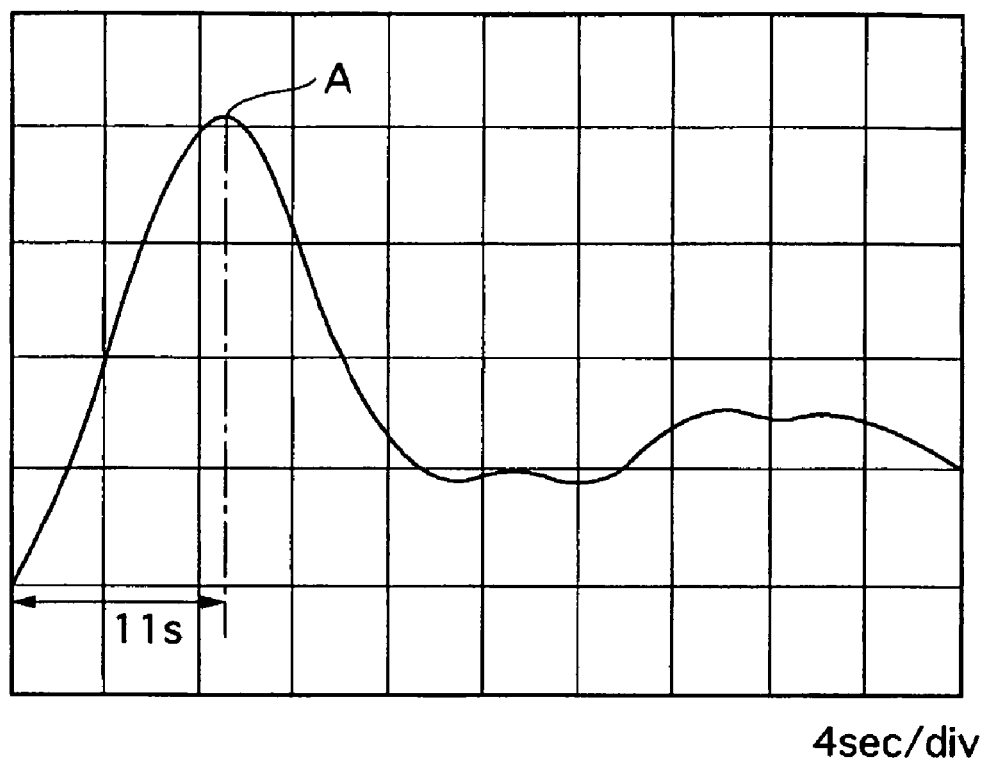
FIG. 10 is graph showing an impulse response output between a fuel flow rate and an amount of $NO_x$.
Figure 11:
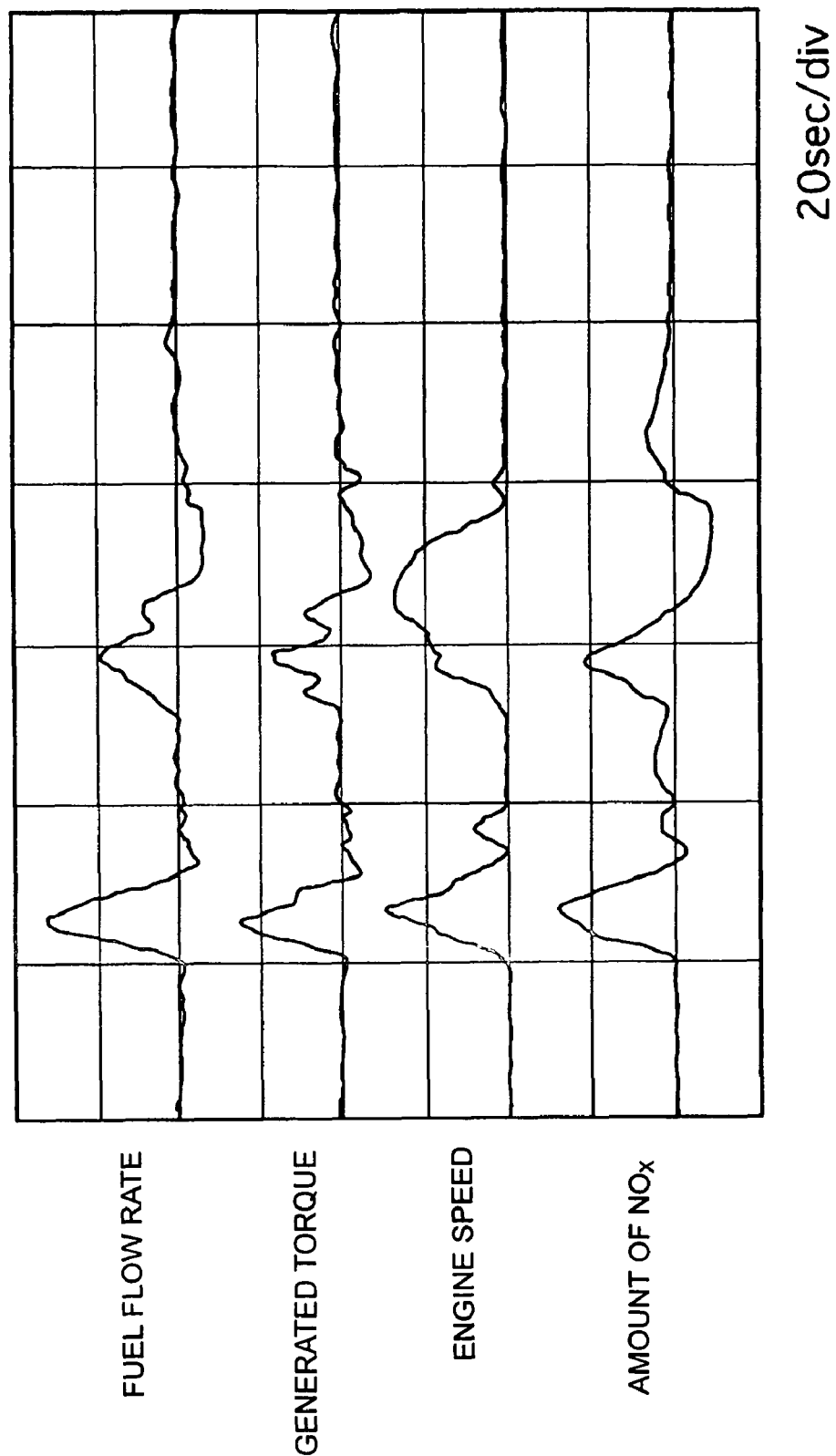
FIG. 11 is a graph showing the time series signals of FIG. 5 that are advanced or delayed using the time axis a fuel flow rate as a reference.
Figure 12:
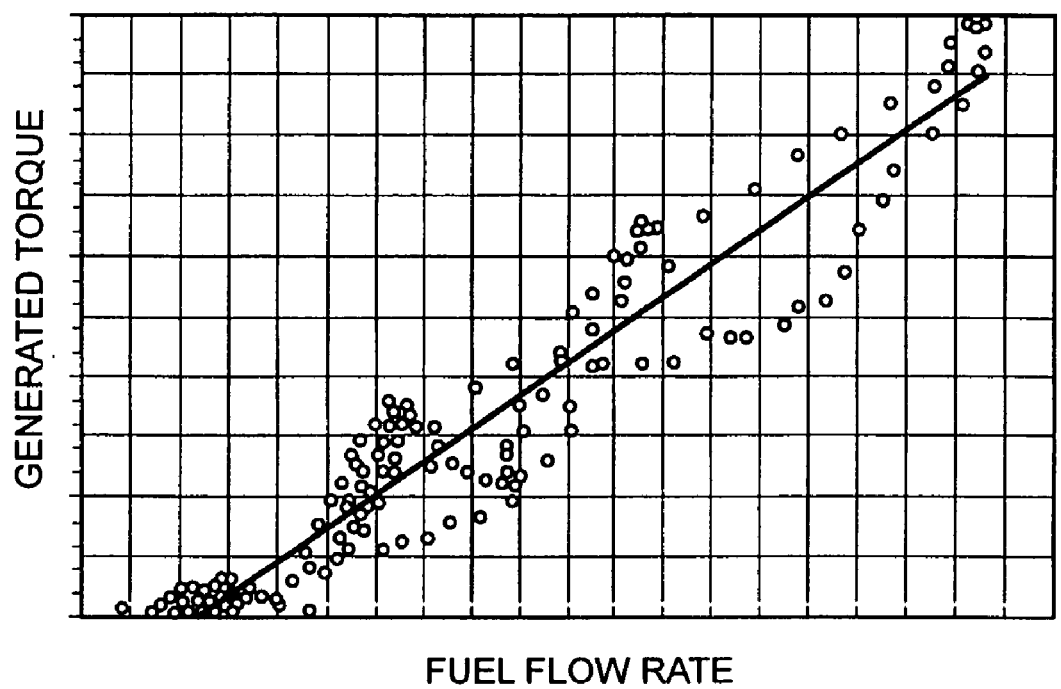
FIG. 12 is a graph showing a correlation between a fuel flow rate and a generated torque in the graph of FIG. 11.
Figure 13:
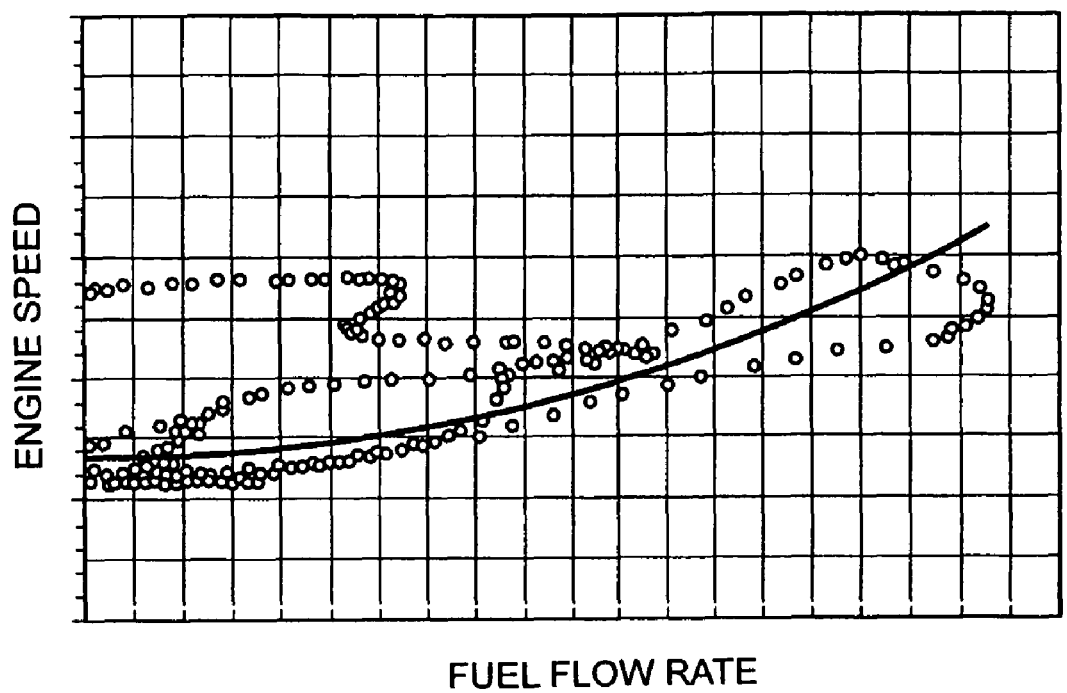
FIG. 13 is a graph showing a correlation between the fuel flow rate and an engine speed in the graph of FIG. 11.
Figure 14:
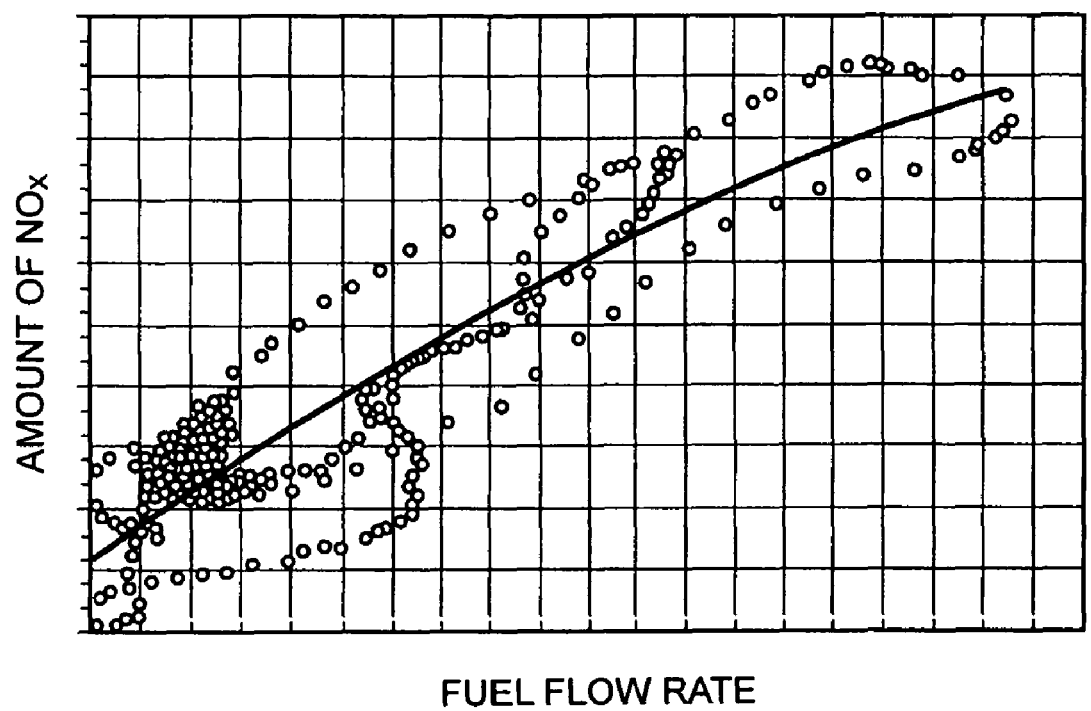
FIG. 14 is a graph showing a correlation between the fuel flow rate and an amount of $NO_x$ in the graph of FIG. 11.
Figure 15:
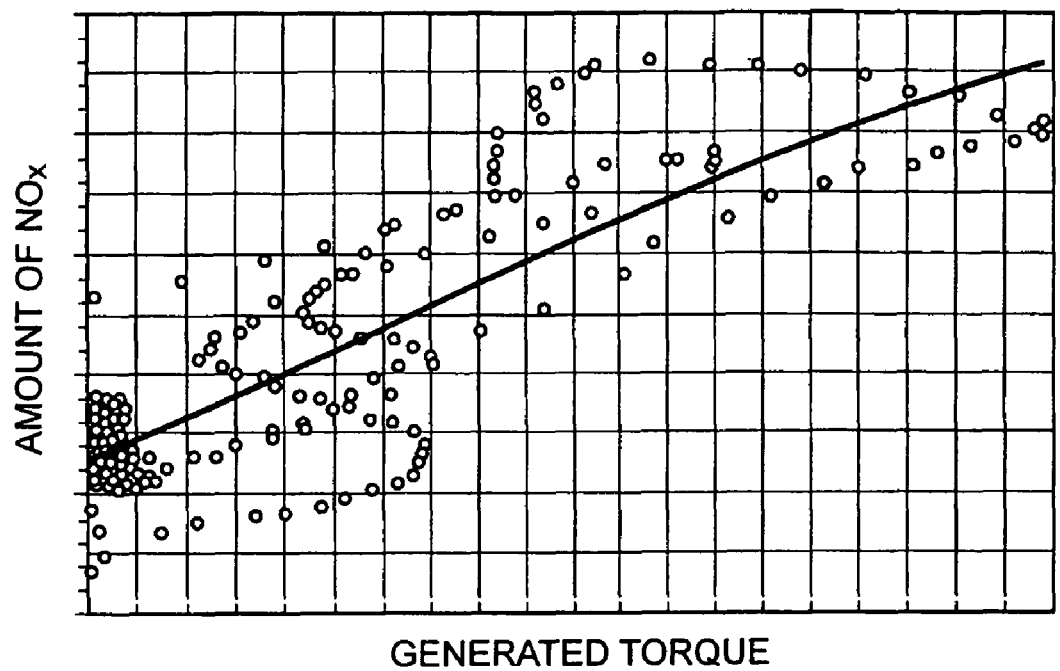
FIG. 15 is a graph showing a correlation between a generated torque and the amount of $NO_x$ in the graph of FIG. 11.

1: multi-signal analyzer
11: AD converter
13: memory
15: time window extraction unit
17: operation/input unit
19: delay time calculation unit
21: delay time generation unit
23: correlation calculation unit
25: multiplication unit
27: integration unit
29: delay time controller
31: FFT calculation unit
33: impulse response calculation unit
35: cross spectrum calculation unit
37: average calculation unit
39: time axis adjustment unit
41: data analyzer
43: display unit
51: engine
53: fuel tank
55: fuel flow meter
57: crank shaft
59: torque sensor
61: tachometer
63: muffler
65: exhaust $NO_x$ sensor

The invention claimed is:

1. A multi-signal analyzer for analyzing an engine, the analyzer providing data for an engine control unit to control engine performance, comprising:
   an AD converter for simultaneously receiving a plurality of time series signals representing physical and chemical phenomena pertaining to the engine and subjecting the signals to AD conversion;
   a delay time calculation unit for calculating delay time between an arbitrary two time series signals from among the plurality of time series signals input to the AD converter;
   a time axis adjustment unit for advancing or delaying a time axis of one signal of the arbitrary two time series signals according to the delay time calculated by the delay time calculation unit, to thereby correlate the two time series signals to the same time axis; and
   a data analyzer for performing analysis such as determining a mutual correlation coefficient by comparing the two time series signals made to have the same time axis,
   wherein the plurality of time series signals comprise signals which represent an engine fuel flow rate having a transient state, an amount of generated torque, an engine rotation speed, and an exhaust gas amount,
   wherein the plurality of time series signals include at least one time series signal that has at least a 10 second delay time relative to another of the plurality of time series signals, and
   wherein the delay time calculation unit performs one of either:
       finding a time point when a mutual correlation coefficient of each of the arbitrary two time series signals is maximum, wherein said time point is set as the delay time, or obtaining an impulse response output representing the correlation coefficient of the two time series signals, wherein peak impulse response output is set as the delay time.

2. A multi-signal analyzer according to claim 1, wherein the delay time calculation unit comprises:
   a delay time generation unit for applying a delay time to one signal of the two arbitrary time series signals;
   a correlation calculation unit for performing an integration processing after the one signal delayed by the delay time generation unit is multiplied by the other signal of the arbitrary two time series signals, to thereby determine a mutual correlation function representing a degree of similarity between the two signals; and
   a delay time controller for controlling the delay time in such a way that the value of the mutual correlation function is maximized, to thereby set the delay time T at such an instance to be the delay time between the two signals.

3. A multi-signal analyzer according to claim 1, wherein the delay time calculation unit comprises:
   an FFT calculation unit for subjecting each of the two arbitrary time series signals to a Fourier Transformation processing for transforming a time function to a frequency function; and
   an impulse response calculation unit for performing an averaging processing after multiplying a conjugate complex number of one signal of the two arbitrary time series signals subjected to the Fourier Transformation processing by the other signal, to thereby obtain an impulse response output representing a degree of correlation between the two signals;
   wherein setting a time at which the value of the impulse response output reaches a peak as the delay time between the two signals.

4. A multi-signal analyzer according to any one of claims 1 to 3, wherein the time axis adjustment unit makes the other signal of the signals input to the AD converter to have the same time axis using the time axis of a selected one signal of the signals as a reference.

5. A multi-signal analyzer according to any one of claims 1 to 3, wherein the plurality of time series signals include multiple signals having a steady state.

6. A multi-signal analyzer according to any one of claims 1 to 3, wherein a time axis for a reference one signal among the plurality of time series signals serves as a reference time axis for correlating all other signals of the plurality of time series signals, and wherein time delays are determined for each of said all other time series signals relative to said reference time axis for subsequent engine control processing.

* * * * *